(12) United States Patent
Roman et al.

(10) Patent No.: US 8,782,135 B2
(45) Date of Patent: Jul. 15, 2014

(54) FOCUSED LISTENING AND ADVERTISING GUIDE SYSTEM AND METHOD

(75) Inventors: Anthony Roman, Newport Beach, CA (US); Rafal Zajac, Costa Mesa, CA (US); David Bibayoff, Rancho Santa Margarita, CA (US); Joshua Moon, Simsbury, CT (US)

(73) Assignee: Radioflag, Inc., Newport Beach, CA (US)

( * ) Notice: Subject to any disclaimer, the term of this patent is extended or adjusted under 35 U.S.C. 154(b) by 305 days.

(21) Appl. No.: 13/077,832

(22) Filed: Mar. 31, 2011

(65) Prior Publication Data
US 2012/0079021 A1    Mar. 29, 2012

Related U.S. Application Data

(63) Continuation-in-part of application No. 11/804,488, filed on May 18, 2007, now abandoned.

(51) Int. Cl.
  *G06F 15/16*  (2006.01)
  *G06Q 99/00*  (2006.01)

(52) U.S. Cl.
  USPC .......................................... 709/204; 705/319

(58) Field of Classification Search
  USPC .......................................... 709/204; 705/319
  See application file for complete search history.

(56) References Cited

U.S. PATENT DOCUMENTS

| | | | |
|---|---|---|---|
| 6,466,765 B1 * | 10/2002 | Tanaka et al. | 455/2.01 |
| 7,027,808 B2 | 4/2006 | Wesby | |
| 2003/0028884 A1 | 2/2003 | Swart et al. | |
| 2004/0198279 A1 * | 10/2004 | Anttila et al. | 455/179.1 |
| 2005/0020223 A1 * | 1/2005 | Ellis et al. | 455/186.1 |
| 2005/0071323 A1 | 3/2005 | Gabriel et al. | |
| 2005/0075095 A1 | 4/2005 | Dillon | |
| 2005/0122435 A1 | 6/2005 | Yunoki | |

(Continued)

FOREIGN PATENT DOCUMENTS

WO    WO 2004/036797 A1    4/2004

OTHER PUBLICATIONS

Zhou, K., "Radio Meets Social," New University [online], Mar. 29, 2011, whole document, [retrieved on Oct. 21, 2013]. Retrieved from the Internet:<URL:http://www.newuniversity.org/2011/03/news/radio-meets-social/>.*

(Continued)

*Primary Examiner* — Rupal Dharia
*Assistant Examiner* — Wing Ma
(74) *Attorney, Agent, or Firm* — William Fitzpatrick

(57) ABSTRACT

A method for providing an online social network of radio listeners, the method comprising the steps of providing a database of radio stations; providing a flagging function to allow the users to generate flags to indicate one or more radio stations; providing a flag-cast comprising a continuously updated feed of the flags generated by the users; providing a profile database storing user data associated with each of the users; providing a communications interface allowing the users to communicate user information to the social network provider; providing a monitoring module to track user activities on the social network; providing an activity database to store activity data about the users; providing a flag database to store flag data related to the flags generated by the users; and providing a flag-cast component that limits the flags displayed in the flag-cast by identifying selected flags.

4 Claims, 11 Drawing Sheets

(56) References Cited

U.S. PATENT DOCUMENTS

| | | | |
|---|---|---|---|
| 2005/0138660 A1 | 6/2005 | Boyer et al. | |
| 2005/0176366 A1 | 8/2005 | Levy | |
| 2006/0101492 A1 | 5/2006 | Lowcock | |
| 2006/0171395 A1* | 8/2006 | Deshpande | 370/393 |
| 2006/0190616 A1 | 8/2006 | Mayerhofer et al. | |
| 2006/0239131 A1 | 10/2006 | Nathan et al. | |
| 2006/0253886 A1 | 11/2006 | Khurana et al. | |
| 2007/0047701 A1 | 3/2007 | Morris | |
| 2007/0174389 A1* | 7/2007 | Armstrong et al. | 709/204 |
| 2007/0282950 A1* | 12/2007 | Fischer et al. | 709/204 |
| 2008/0109764 A1* | 5/2008 | Linnamaki | 715/864 |
| 2008/0293393 A1* | 11/2008 | Hartmaier | 455/414.3 |
| 2008/0318529 A1* | 12/2008 | Harb | 455/66.1 |
| 2011/0153646 A1* | 6/2011 | Hong et al. | 707/769 |

OTHER PUBLICATIONS

Dziczkowski, G.; Bougueroua, L.; Wegrzyn-Wolska, K., "Social Network—An Autonomous System Designed for Radio Recommendation," Computational Aspects of Social Networks, 2009. CASON '09. International Conference on , vol., no., pp. 57,64, Jun. 24-27, 2009, [retrieved on Dec. 2, 2013], <URL: http://ieeexplore.ieee.org/stamp/stamp.jsptp=&arnumber=517610>.*

O'Hear, S., "What can social networks do for traditional radio?," ZDNet [online], May 1, 2007, whole document, [retrieved on Dec. 3, 2013]. Retrieved from the Internet<URL:http://www.zdnet.com/blog/social/what-can-social-networks-do-for-traditional-radio/152>.*

* cited by examiner

FOCUSED LISTENING AND ADVERTISING GUIDE SYSTEM AND METHOD

CROSS-REFERENCES TO RELATED APPLICATIONS

This patent application is a continuation-in-part and claims the benefit of U.S. patent application Ser. No. 11/804,488 filed May 18, 2007 now abandoned for Focused Listening and Advertising Guide System and Method. That application is incorporated here by this reference.

TECHNICAL FIELD

This invention relates to systems and methods for matching listeners with sound providers. More particularly, the present invention technically relates to systems and methods for matching radio listeners with radio broadcast providers. Even more particularly, the present invention technically relates to systems and methods for matching radio listeners with selected and targeted radio broadcast content.

BACKGROUND ART

The currently existing related art involves several systems and methods for providing music or other radio broadcast content. Radio retains its position as the mainstay medium, according to the latest total radio listening estimates compiled by RADAR®, the radio network and national audience measurement service of Arbitron, Inc. Initial findings by RADAR indicate that, over the course of a typical week, radio reaches 93% of all persons and reaches more than 94% of adults who live in a household with an income of $75,000 or more. Further, 94% of college graduates listen to radio, 81% of adults listen to radio while in their cars, and 24% of adults listen to radio at work.

Most conventionally, terrestrial radio stations, i.e., AM/FM radio, exist which provides some limited programming. More recently, satellite radio services, such as SIRIUS®, provide a wider variety of radio programming. Listeners may also download music online via their personal computers. However, the common problem with the foregoing related art systems and methods is that they still require the user to "channel-surf" to find desirable music or other radio broadcast content. Thus, a long-felt need is seen to exist for a system and a method for eliminating the need to channel-surf for identifying and selecting desirable radio broadcast content.

DISCLOSURE OF INVENTION

The present invention addresses the foregoing problems in the related art in a system and corresponding methods for providing listeners with managed, personalized, valued radio broadcast content, in real time, from a broadcasting entity, by way of a mobile device, for offering a mobile marketing medium to advertisers to micro-target consumers with advertisement, for leveraging unmatched psychographics and demographics, and for eliminating a need to surf radio channels. The present invention involves a free, wireless, network-based system which generally comprises a network, a flagging software being made available via the network in a website, and at least one mobile device for entering user information by at least one user and for receiving, playing, storing, and retransmitting radio broadcast content, the at least one mobile device being capable of interfacing with the network.

The present invention also involves a method of creating a free, wireless, network-based system for providing listeners with managed, personalized, valued radio broadcast content, in real time, from a broadcasting entity, by way of a mobile device, for offering a mobile marketing medium to advertisers to micro-target consumers with advertisement, for leveraging unmatched psychographics and demographics, and for eliminating a need to surf radio channels. The method of providing the system generally comprising the steps of providing a network, providing a flagging software being made available via the network in a website, and providing at least one mobile device for entering user information by at least one user and for receiving, playing, storing, and retransmitting radio broadcast content, the at least one mobile device being capable of interfacing with the network.

The present invention also involves a corresponding method of providing listeners with managed, personalized, valued radio broadcast content, in real time, from a broadcasting entity, of offering a mobile marketing medium to advertisers to micro-target consumers with advertisement, of leveraging unmatched psychographics and demographics, and of eliminating a need to surf radio channels, by way of a free, wireless, network-based system. This method generally comprising the steps of providing the free, wireless, network-based system, the system providing step comprising the steps of providing a network, providing a flagging software being made available via the network in a website, and providing at least one mobile device for entering user information by at least one user and for receiving, playing, storing, and retransmitting radio broadcast content, the at least one mobile device being capable of interfacing with the network; registering at least one user, using the flagging software as at least one subscriber; using the system by the at least one subscriber, thereby matching the at least one subscriber with at least one radio broadcast content; and downloading the at least one radio broadcast content via the at least one mobile device.

The present invention also involves utilizing a market opportunity hitherto untapped. Major companies are investing in exclusive campaigns and technologies that are aimed at mobile marketing, and, for some businesses, this has proven highly successful. Marketers are just beginning to realize that the mobile lifestyle cuts across socioeconomic barriers. Most people in the United States have a cellular phone. With 200 million handsets currently sold, everyone can participate in mobile marketing. Unlike the Internet, cellular phones are an extension of the user. Worldwide mobile advertisement spending has topped $870 million in the year 2006, and is expected to explode in the United States alone to $10 billion by the year 2010. Mobile advertisements are capturing detailed demographics and consistently more than a 28 percent response rate. For mobile marketing campaigns to be effective, the advertisements must be accompanied by original and creative content valued by mobile phone users.

Society's constant thirst for information and entertainment in the 21st century, has obviously sparked rapid growth in radio listenership, especially in the talk radio segment, thereby leaving between 34,000,000 and 80,000,000 weekly talk show addicts alone, coping with programming overload and unpredictability. FM youth talkers who address social and political issues, are even capturing young audiences. Avid listeners are without any direction, listening to their favorite stations, thereby hoping that their specific interests and favorite music will be the focus of programmers. Unlike television programming, where all shows and guests are programmed long in advance and viewers are guaranteed that they will not miss their favorites by having access to TV guides and other forms of available schedules, radio listeners float aimlessly through airwave space, waiting to be served up pot luck programming. Everyday, there are more than 10,200 guests that appear on approximately 6,000 radio talk or interview shows across America. In comparison, only approximately 988 TV shows exist, and 57% of all radio listeners desire better search functions for station format alone. Thus, a long-felt need for radio scheduling and display technologies exists.

The present invention involves a "value" proposition concept. The system is a wireless and Internet-based for providing listeners with managed and personalized valued radio content real time via mobile device free of charge, thereby ultimately offering advertisers a mobile marketing medium to micro-target consumers with their messages, leveraging unmatched psychographics and demographics generated by the system subscribers. Proprietary technology will flag radio shows and on air content of interest, specified by unique subscribers/listeners to the system, alerting them to tune-in. As such, users desire to eliminate switching stations only to find out that the user just missed another rare interview with his/her favorite personality, a specific topic of interest, or exclusive story of great importance. In addition, text-directed podcast downloads of desired radio content sent to a personalized listening library for later downloads is a mobile device function in the present system should an alert to tune-in be received at an inconvenient listening time for the user.

In another aspect, the invention can be described as a method for providing an online social network of radio listeners. The method includes the steps of providing a database of radio stations; providing a flagging function to allow the users to generate flags to indicate one or more radio stations; providing a flag-cast comprising a continuously updated feed of the flags generated by the users; providing a profile database storing user data associated with each of the users; providing a communications interface allowing the users to communicate user information to the social network provider; providing a monitoring module to track user activities on the social network; providing an activity database to store activity data about the users; providing a flag database to store flag data related to the flags generated by the users; and providing a flag-cast component that limits the flags displayed in the flag-cast by identifying selected flags.

Advantages of the present invention include, but are not limited to, providing listeners with managed, personalized, valued radio broadcast content, in real time, from a broadcasting entity, offering a mobile marketing medium to advertisers to micro-target consumers with advertisement, leveraging unmatched psychographics and demographics, eliminating a need to surf radio channels, increasing driving safety by eliminating the need for leaning over to channel-surf, and optimizing a listener's enjoyment of radio. Other features of the present invention are disclosed in, or are apparent from, the descriptions in this document.

BEST MODE FOR CARRYING OUT THE INVENTION

Figure 1:
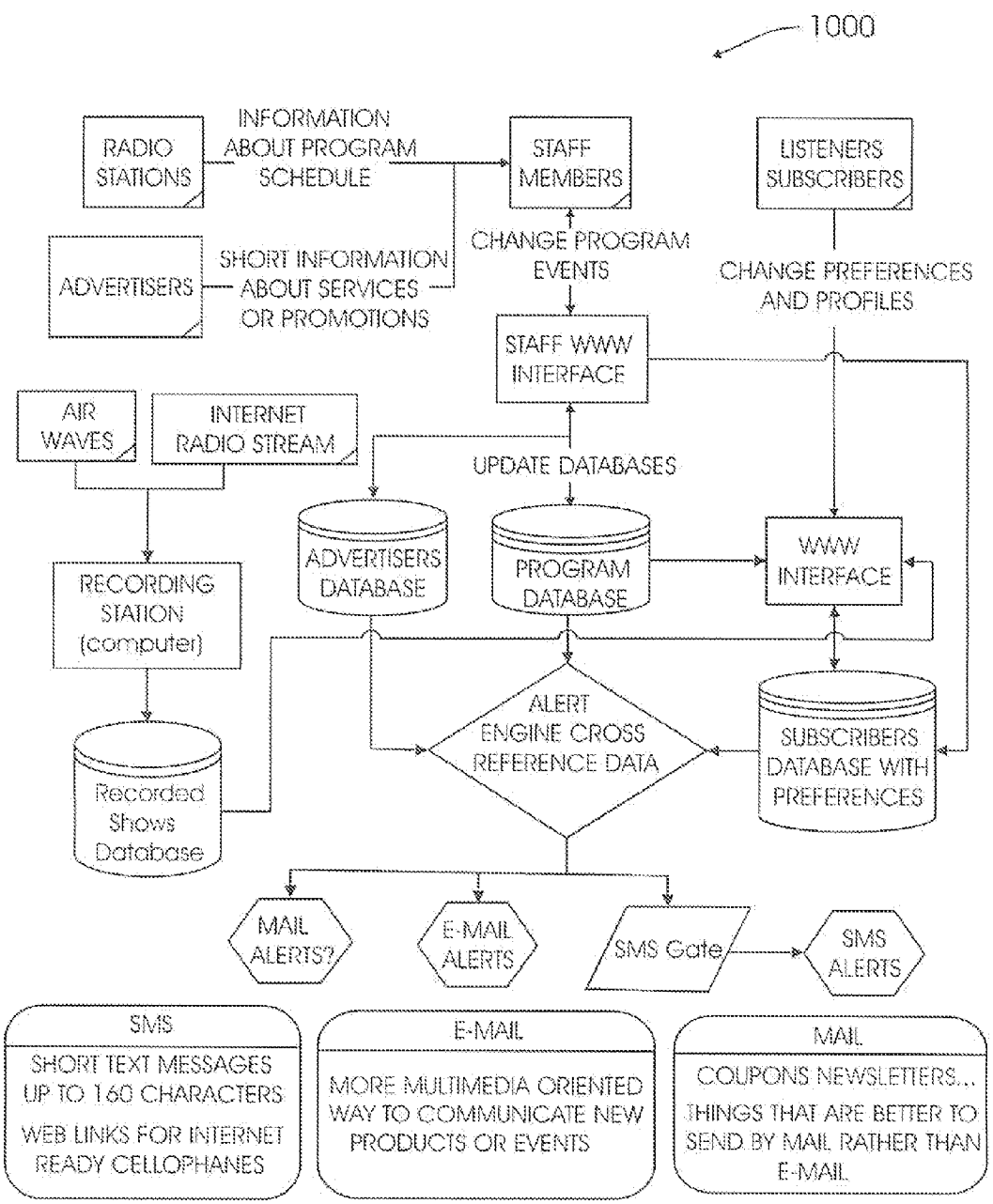
FIG. 1 is a schematic diagram of a radio flagging system, in accordance with the present invention.

The present invention generally involves a radio program guide alert system 1000, i.e., a flagging system, and its technology, which comprises real time notifications via a mobile device, such as a mobile phone, 24 hours per day and 7 days per week. The flagging software enables the system 1000 to seek radio shows and on air-content of interest, which are specified by subscribers to the system 1000, and to alert those subscribers to "tune-in" the alerted radio broadcast content. Subscribers of the system 1000 will no longer have to resort to switching stations, as otherwise would be the case in the related art, only to discover that they have missed a rare interview with their favorite personalities, favorite topics, or stories of great importance.

In the system 1000, subscribers go to the website, register, and program their interests, whereby the system 1000 generates their profiles. In particular, they enter user information or data, such as favorite radio stations, music, hosts, celebrities, athletes, sports teams, politicians, shows, etc. They program topics of interests, such as politics, celebrity gossip, movies, sports, food, law, religion, traffic, etc. Subscribers program their interests from the most basic to most specific levels, if desired. They also program their most likely radio listening and driving schedules. They program the degree to which, or frequency with which, they wish to be notified of radio programming. When subscribers are in a radio listening mode, they can activate the flagging system 1000 on a mobile device, e.g., a cellular phone, a headset, a PDA, and a dash-top RADIOFLAG™ device. The mobile device is also screen-oriented.

Using the present invention, subscribers casually listen to music on their radios, after having programmed their data into the system 1000, whereby profiles are generated to alert the subscribers to a broadcast of interest, wherein their cellular phones suddenly buzz them, thereby alerting them of radio broadcast content of interest. Pleasantly surprised, the subscribers are then furnished with the information and entertainment they greatly value without any effort or distraction in searching or waiting. The system 1000 tracks user habits as well. In this case, user habits are related to listening trends which are monitored in real time, thereby providing useful marketing and programming information to station managers and advertisers, thereby leading to better programming, and thereby ultimately resulting in a better radio listening experience.

Additional features of the system 1000 are as follows. Any station's pre-programmed show information will be posted on the system 1000 website for scheduled listening. Users can call, 24 hours per day and 7 days per week, to remotely re-program their user information to regenerate their profiles. Notification is made available of available podcasting downloads of missed shows or segments. Even if the user has not programmed specific interests in the user information, the system 1000 will make suggestions based on profile and history. A webpage is updated daily with programming recommendations based on the most current hot topics or events, as they unfold by the hour, day, week, or month. When traveling out of the user's normal driving vicinity, the system 1000 will automatically switch and search stations in the new driving area when programmed to do so. A search engine interface option is also available, whereby matching the search options with the alerted programming of interest is performed, e.g., the flagging software may ask: "Should a subscriber receive an alert to tune into an on-air topic related to real estate investing in New York?" If the answer to such query is "yes," the system 1000 then searches listings which include New York realtors and real estate investment firms. The present invention system 1000 comprises a feature for receiving advertisement revenue generated by any affiliated search engine, e.g., Google® or Yahoo®.

The system 1000 also comprises a feature for "Real-Time Immediate Targeted Text Advertising" (using short messaging service or "SMS"). Targeted text and/or video advertisements are matched with listeners utilizing the system 1000. The advertisements accompany the alerts to subscribers. By offering incentives to listeners, the system 1000 is made available free of charge to the subscribers. Revenue is, instead, generated by selling cellular phone video and text advertising to marketers who are seeking to reach specific target markets. Marketers advertise using the system 1000 to reach targeted customers based on listeners' profiles, specifically their listening habits and interests. Text and/or video advertisements will only appear either when an alert has been sent to a subscriber or when permitted by the subscriber. The subscriber has pre-authorized the system 1000 to send advertisement messages in exchange for the free service provided by the system 1000. To avoid becoming a nuisance to the subscriber, the number of advertisements is limited. For instance, some marketer's advertisements may appeal more to subscribers who drive during the hours from 6:00 am to 9:00 am, as opposed to those who drive during the hours from 4:00 pm to 7:00 pm, or to subscribers who drive on one freeway/expressway, as opposed to those who drive on another freeway/expressway. A listening driver who is traveling a specific route during a specific time of the day may be a candidate for a marketer who has a store located along such route and wishes to reach the listening driver with a special offer or a coupon, thereby increasing the probability that the listening driver may stop and make a purchase. All alerts are weighted with a score based on listening importance so that subscribers are not overloaded with alerts.

Additional incentives will be offered to subscribers who forward advertisements to others who may find them of interest (retransmission), thereby creating a viral marketing effort on the behalf of advertisers. The benefit of text messages is that a user can pass such messages to friends in connection with the user's name, whereby an environment of trust is better established for the advertiser. Advertisements are also sent to subscribers on behalf of marketers, based on a subscriber's profile, thereby indicating whether the subscribers are actually listening to stations where the marketer's product are also advertised, and thereby creating a synergistic, coordinated, marketing effort for advertisers.

The system 1000 also comprises a search engine using speech-recognition technology that scans or searches spoken content on all radio stations, including those broadcasting on terrestrial, satellite, and over the Internet, that filters the content and distributes a SMS or a text message which alerts the subscribers of pre-qualified content of interest. Advertisements that match the profile of the subscriber, along with other demographics, are associated with the notification in the form of a text message. For instance, a subscriber, being notified of a broadcast concerning a health topic, would receive the alert accompanied by a SMS advertisement for a health food product or a health food store.

To eliminate the need for manual data entry when scanning the radio, the system 1000 incorporates speech-recognition technology that transforms spoken words into alphanumeric text and navigational commands recognizable by a personal computer (PC). Two primary components of speech recognition exist. The first piece, called the acoustic model, analyzes the sounds of a voice and converts those sounds into phonemes, the basic elements of speech. The English language contains approximately fifty phonemes. Speech-recognition technology breaks-down a voice by using the acoustic model to remove noise and any unnecessary information such as changes in volume, using mathematical calculations to reduce the data to a spectrum of frequencies (the pitches of the sounds), analyzing the data, and converting the words into digital representations of phonemes. The second major component of speech-recognition software is the language model. The language model analyzes the content of speech and compares the combinations of phonemes to the words in its digital dictionary, a huge database of the most common words in the English language.

FIG. 1 illustrates, in a schematic diagram, an outline of a radio flagging system 1000, in accordance with the present invention. The system 1000 comprises a technology in flagging software (a comprehensive package) that will scan or search spoken content on all radio stations, including those broadcasting on terrestrial, satellite and over the Internet. Driven by the flagging software, including a search and match engine, the system 1000 seeks verbal content, filters it, and distributes a message via SMS or via text message alerts, thereby notifying subscribers of pre-qualified valued radio content and text advertisements of potential interest. As more and more mobile phones become equipped with video and audio applications, a sampling of a broadcast of interest is also sent via the system 1000. Advertisements matching the profile of the subscriber along with other psychographic and demographic data, are matched with the notification which may be accompanied by a text message and/or an alert message. For example, a subscriber, who may have been notified of a broadcast concerning a health topic, would receive the alert accompanied by a SMS advertisement for a health food product or store.

Figure 2A:
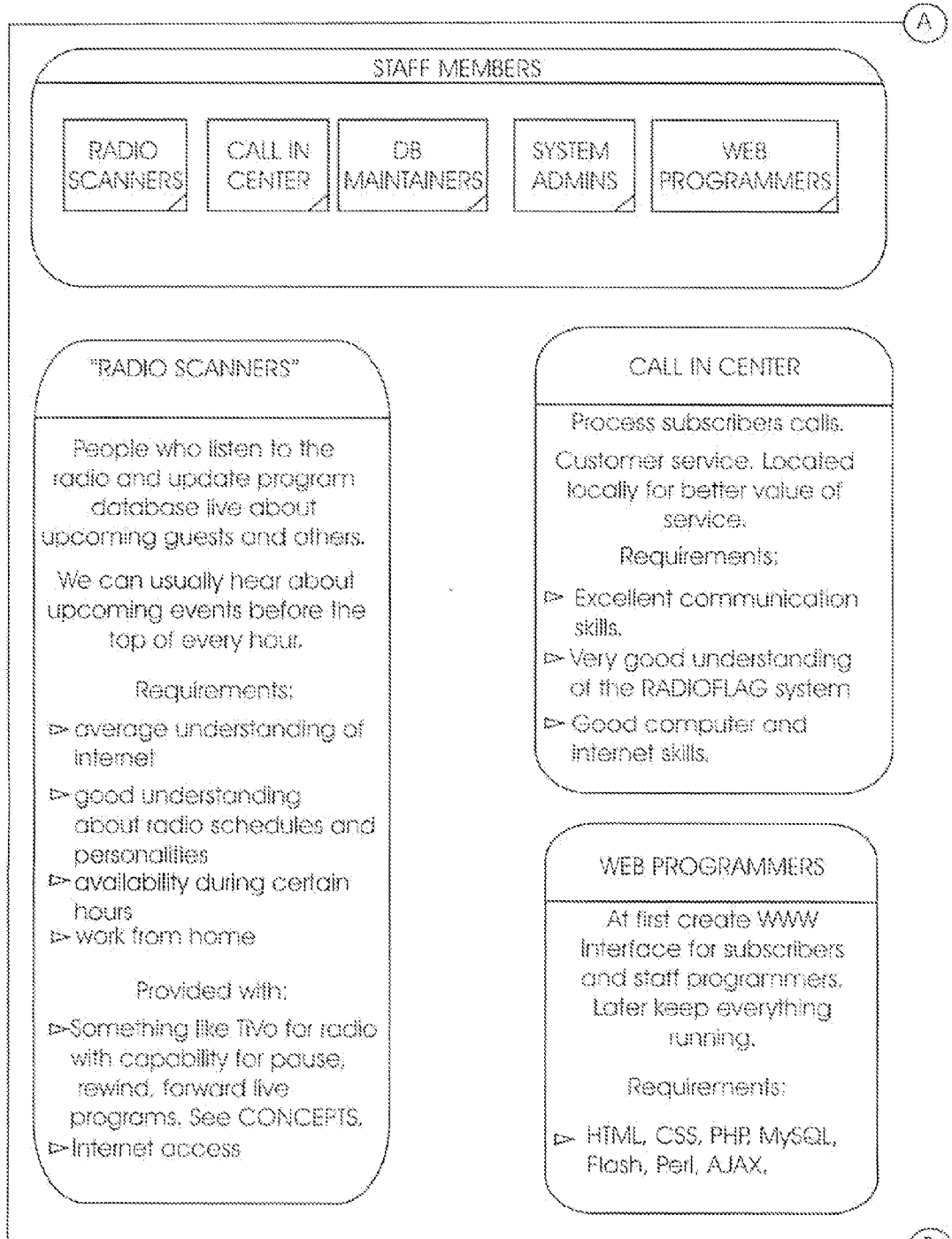
FIG. 2 is a schematic diagram of assistance provided by the plurality of staff members in a radio flagging system shown in FIG. 1, in accordance with the present invention.
Figure 2B:
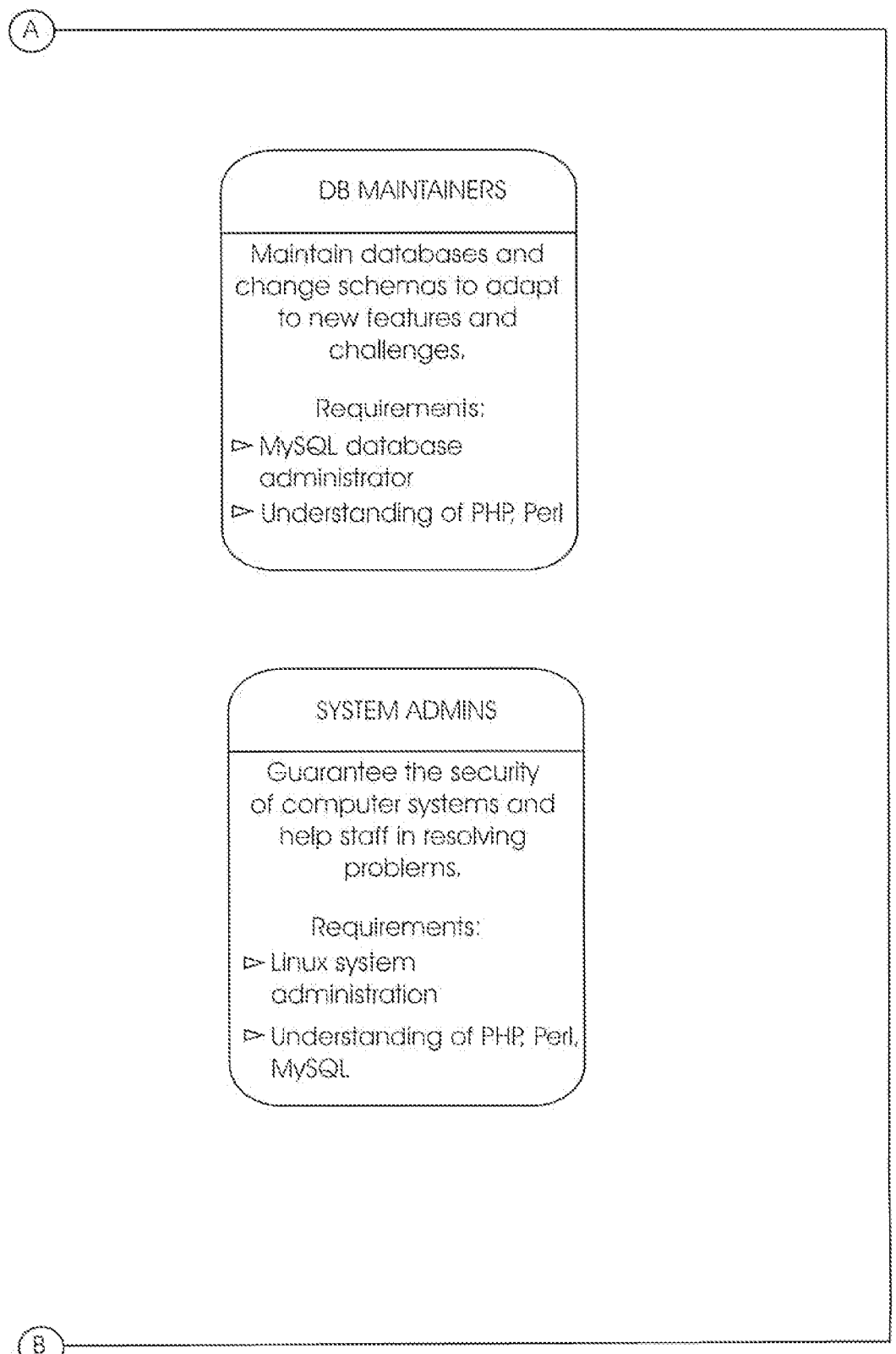

FIG. 2 illustrates, in a schematic diagram, outlining the assistance provided by the plurality of staff members in a radio flagging system 1000 of FIG. 1, in accordance with the present invention. A data entry staff and programmers are assigned to specific radio markets. The staff manually monitors those market radio stations for content and program the information into the database for processing and distribution to radio listeners. To eliminate the need for manual data entry when scanning the radio, the system 1000 further incorporates speech-recognition technology that transforms spoken words into alphanumeric text and navigational commands that can be recognized by a PC.

Figure 3:
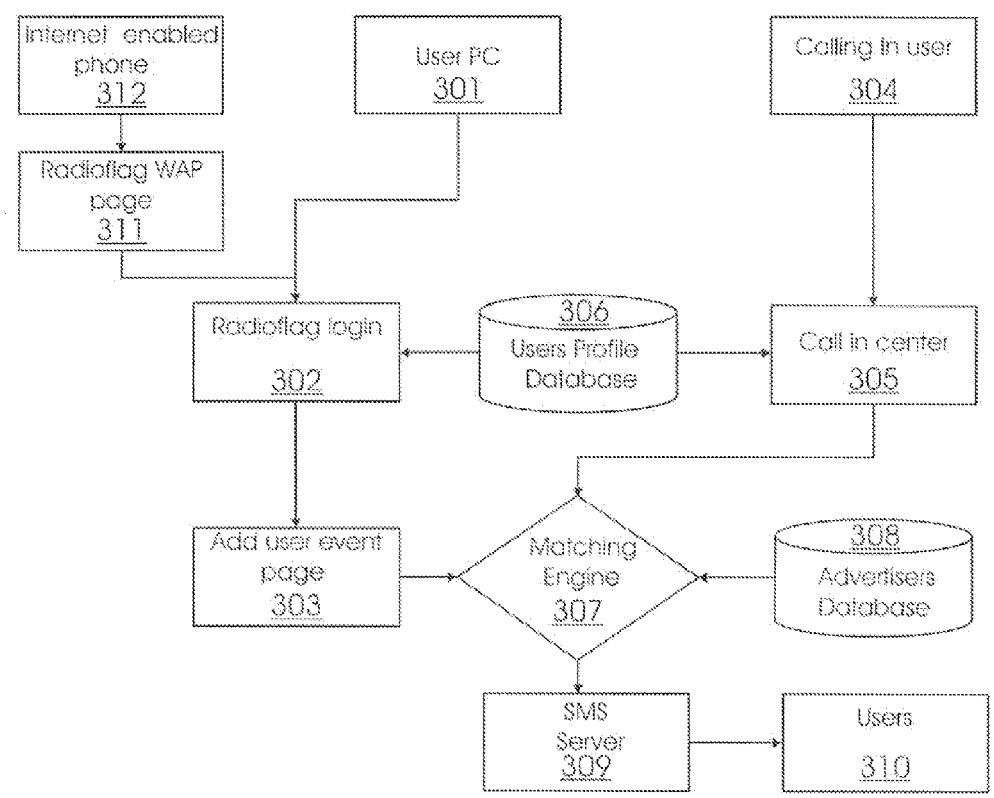
FIG. 3 is a schematic diagram of a plurality of scanners being users in a radio flagging system, in accordance with the present invention.

FIG. 3 illustrates, in a schematic diagram, outlining a plurality of scanners being users in a radio flagging system 1000, in accordance with the present invention. Viral advertisements are those that are used when a listener feels that a friend would be interested in the advertisement or broadcast and wants to alert the friend to it. The user forwards the message to the friend. And if the friend also interacts or opts-in, the system 1000 is compensated for generating the advertisement, i.e., utilizing the benefits of "word of mouth" and "endorsement by friends." The system 1000 may also comprise a website which is community-driven, wherein an alert may be posted in a manner such as by using a personal computer as indicated by block 301, using a call center as indicated by block 304, and using a web-enabled cellular phone as indicated by block 312.

In particular, a text alert is transmitted to the subscriber which is attached to a sponsor advertisement. The user will also have the option to participate with the advertiser who wishes to further his reach, thereby offering the user a special reward for his/her effort. If the user opts-in via a text message, instructions are sent to the user's e-mail address and cellular phone. By example only, if the advertiser is MICROSOFT®, Inc., the advertiser instructs the user (if the user truly enjoys MICROSOFT® products) to approve one of several prepared personalized advertisement lines or slogans, e.g., "love this software." The user photographs himself/herself, e.g., using his/her camera phone while sitting at a desktop with the product or anywhere else that the product is featured, and sends the photograph to a plurality of friends most likely to enjoy the message. The system 1000 further comprises a feature that enables the user to insert his composed message or slogan as well. Thus, the advertisement is made in a real life situation in the present invention. The message will then be sent via the system 1000, acting as a clearinghouse, whereby the advertisement generation is tracked. The persons receiving the message also receive written confirmation that the advertisement originates from the user, wherein the system 1000 is not identified. In addition, the cellular phone numbers are never used for any purpose whatsoever and are not even shared with the advertiser, unless one of the recipients then opts to interact with the advertiser via a text message.

Still referring to FIG. 3, for an alert being posted via a PC, a user logs onto the system 1000 via the PC, as indicated by blocks 301 and 302, and clicks the indicator for the link for adding the user event page, as indicated by block 303, wherein the user selects a topic for which he/she desires an alert sent to other persons, wherein the user describes the desired alert message as would be otherwise prepared by a scanner, wherein an alert from a user is sent to a matching engine, as indicated by block 307, and is processed in the same manner as it would otherwise be processed along with an automatically generated advertisement, wherein every user alert is logged with an identification number to track any user abuse, wherein a user is rewarded for his/her efforts by "alert points" which he/she can exchange for available rewards at a later time, and wherein the user shares in the revenue generated from the advertisements flowing from his alerts to other persons.

Also referring to FIG. 3, for an alert being posted via a call center, the user phones the call center, as indicated by block 304, whereby the user is prompted for log-in information, as indicated by block 305, wherein the user describes the desired alert message as would be otherwise prepared by a scanner wherein a alert from a user is sent to a matching engine, as indicated by block 307, and is processed in the same manner as it would otherwise be processed along with an automatically generated advertisement, as indicated by blocks 309 and 310, wherein every user alert is logged with an identification number to track any user abuse, wherein a user is rewarded for his/her efforts by "alert points" which he/she can exchange for available rewards at a later time, and wherein the user shares in the revenue generated from the advertisements flowing from his alerts to other persons. By example only, the software facilitates selecting a topic within a genre or other category by recognizing the first letter being typed into the system 1000 by the user and providing the user with selections starting with such letter. The user is prompted to accept a topical element from a list of choices.

In relation to FIG. 3, for an alert being posted via an Internet-enabled mobile device, such as a cellular phone, as indicated by block 312, the user log into a wireless application protocol (WAP) page, as indicated by block 304, whereby the user is prompted for log-in information, as indicated by block 302, wherein the user describes the desired alert message as would be otherwise prepared by a scanner, as indicated by block 303, wherein a alert from a user is sent to a matching engine, as indicated by block 307, and is processed in the same manner as it would otherwise be processed along with an automatically generated advertisement, as indicated by blocks 309 and 310, wherein every user alert is logged with an identification number to track any user abuse, wherein a user is rewarded for his/her efforts by "alert points" which he/she can exchange for available rewards at a later time, and wherein the user shares in the revenue generated from the advertisements flowing from his alerts to other persons.

The foregoing process can also be performed via e-mail to friends using a technique called "unsolicited ads in life" in the system 1000. By example only, if a subscriber is at Disneyland® and wishes to be compensated for advertising Disneyland® to his friends, then he would first determine whether Disneyland® is a system participant, e.g., in an "AdsInLife" program by signage located at the park or by visiting the website via WAP. If the user determines that the establishment is indeed a program participant, then the user may take a group photograph of himself/herself with friends by camera phone at the establishment and send the group photograph to several other friends. The user then texts the system 1000 via a short-code with a corresponding Disney® text message, and the system 1000 messages-back the instructions and rewards for sending the advertisement to the several other friends. The user then selects the pre-approved message, adds his composed message, and sends the advertisement via the system 1000, whereby the text message(s) is/are distributed to the several other friends. This can also be done via e-mail to the several other friends. Advertisements are also available for posting throughout the system 1000 website and WAP site.

Also referring to FIG. 3, an alert is identified, sorted, and matched with advertisements using persons who operate as scanners. Such persons are specialists focusing on one particular category or genre of interest, e.g., a person who is sports-oriented is assigned the task of monitoring the field of sports. Such a person knows what radio broadcast content is relevant. When a pre-qualified broadcast is about to air, the specialist enters or keys a signal to prompt the alert to be sent. By example only, a live interview with David Beckham is imminent. The specialist would enter keywords or phrases such as "sports," "soccer," "Real Madrid," "Los Angeles Galaxy," "David Beckham interview," and "rare." In so doing, the system 1000 assures that all users, who are on various levels of interest, are alerted to the broadcast. Advertisements, matching those specific demographics and psychographics of each alerted subscriber, accompany the message. If a show has already been live-broadcast in one radio market and alerts have already been sent and recorded in the system 1000 database, a scanner is unnecessary if the same show is broadcast later as a prerecorded show in another market. The alerts are sent automatically corresponding to the appropriate times.

Figure 4:
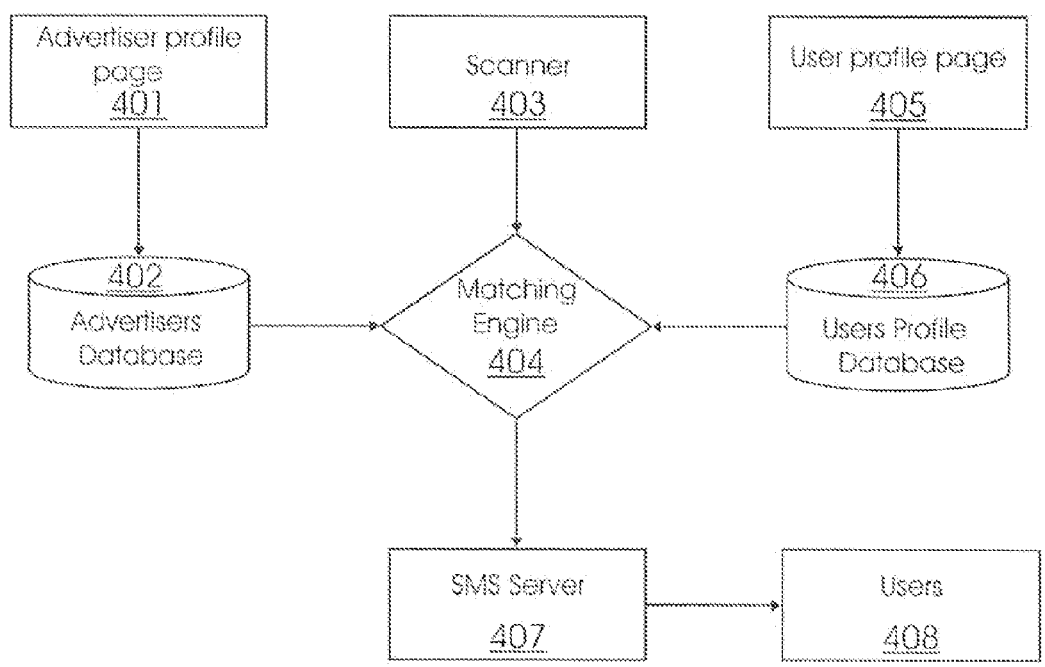
FIG. 4 is a schematic diagram of an advertisement sending step in the present method using a radio flagging system, in accordance with the present invention.

FIG. 4 illustrates, in a schematic diagram, an advertisement sending step in the present method of using a radio flagging system 1000, in accordance with the present invention. This diagram demonstrates the basic substeps in sending the SMS text message to the user and matching it with the target advertiser and the advertisement. The first substep comprises defining a target system user by an advertiser, wherein the system staff enter the advertiser's advertisement campaign specifics into an advertiser database, as indicated by blocks 401 and 402. In the second substep, the scanner or automated speech recognition software, which is monitoring the broadcasting of an event, enters the specifics of the broadcast, as indicated by block 403. In the third substep, the matching engine, using sophisticated algorithms, then matches the advertisement with the alert, as indicated by block 404. In the fourth substep, the same engine matches the alerted selected users with the advertisements, as indicated by blocks 405 and 406. In the fifth substep, the selected users and their contact mobile phone numbers are then fed to the "SMS Server," as indicated by block 407, which then sends the SMS alerts to the users, as indicated by block 408.

Still referring to FIG. 4, an advertiser will be able to explore our database, and leverage the demographics and psychographics of subscribers that have been added to the system database for a micro-targeting campaign. By example only, if a sporting goods manufacturer recently produces a collector's "Kobe Bryant" jersey and wants to effectively market it, the manufacturer begins its search for sports fans, narrows the search to basketball fans, narrows the search to "Lakers" fans, and then narrows the search to "Kobe Bryant" fans specifically. When a text message is sent to a subscriber alerting him to a "Kobe Bryant" broadcast, the advertisement provided to the system 1000 by the advertiser/manufacturer will accompany the alert message.

Figure 5:
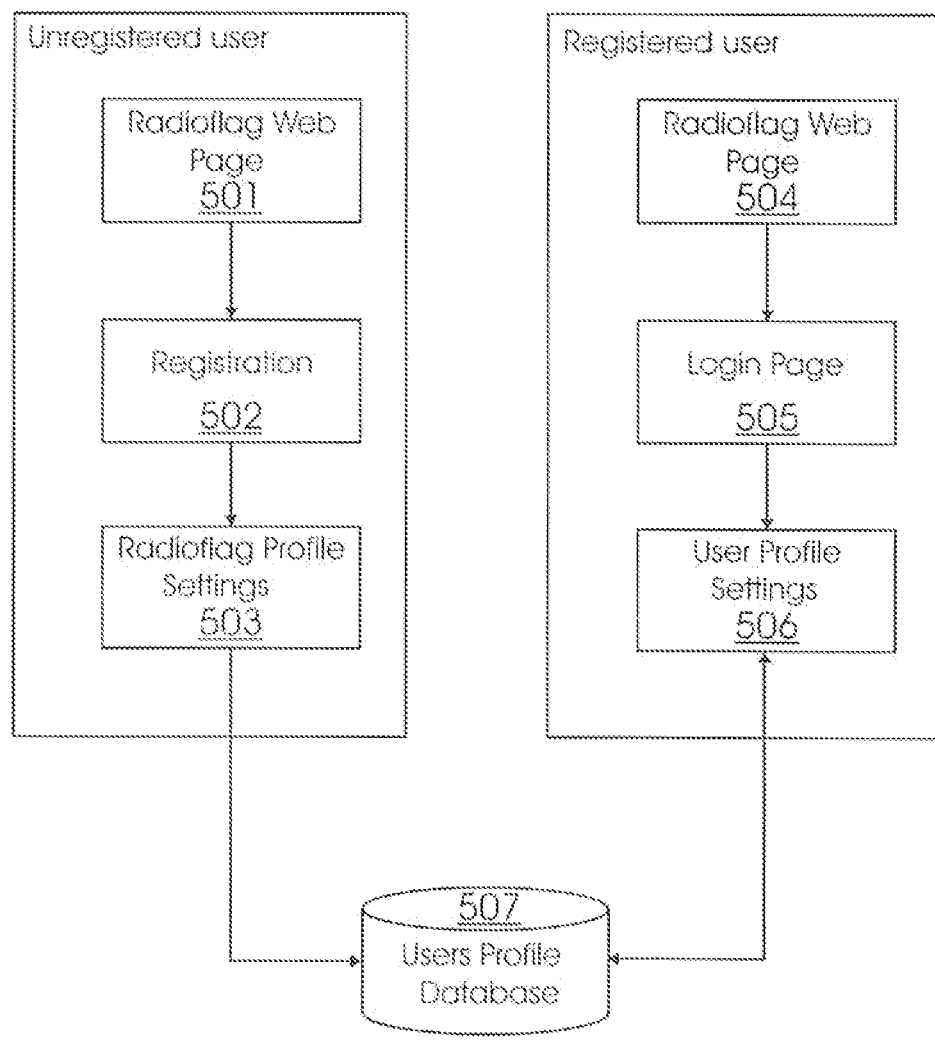
FIG. 5 is a schematic diagram of a registering step in the present method using a radio flagging system, wherein a user profile is generated, in accordance with the present invention.

FIG. 5 illustrates, in a schematic diagram, a registering step in the present method of using a radio flagging system 1000, wherein a user profile is generated, in accordance with the present invention. To register and take advantage of all the system's features, users go to the website, and register via a process, as indicated by blocks 501, 502, 503, whereby a plurality of registered users or subscribers are generated. The present method comprises generating profile settings, thereby enabling the users to set all of their alert preferences, as herein described, as indicated by block 503. The plurality of registered users or subscribers can then return at any time, as indicated by blocks 504, 505, 506, and modify their profiles using either a web browser or a web-enabled cellular phone. All the users' preferences are stored in a "user profile database," as indicated by block 507. These preferences are later accessed by other components of the present system 1000 for managing and sending personalized SMS messages and for providing a wide range of other services and features as herein disclosed.

In relation to FIG. 5, the method M2 of using the present invention flagging system 1000, comprises the steps of going to a website or WAP site for the system 1000 (by the user, as the subscriber, registering as a new member, providing user information, such as mobile phone information, e-mail address information, listening schedule information, work contact information, and residential contact information, e.g., a zip code, favorite radio station(s) information, etc., setting-up listening alert preferences profile using the web or WAP-enabled phone, thereby enabling subscribers to narrow their alerts by selecting from different levels of focus, e.g., "selecting sports, if not sufficiently focused, then selecting sports category and sports personality, if not sufficiently focused still, then selecting team, if not sufficiently focused still, then selecting a player or team member such as a coach, a manager, etc."

By example only, if the subscriber listens all day to the radio via a mobile device and learns about a favorite team, e.g., the "Lakers," an alert focusing on such topic is unnecessary. However, the present invention method M2 of using the present invention system 1000 comprises the step of narrowing the search to a player, e.g., "Kobe Bryant," because the subscriber would not want to miss hearing any interviews being conducted with this player or any in-depth discussions related to this player. The method M2 of using the system 1000 comprises alerting the subscriber to broadcasts which are narrowly focused on this player, subsequently on any other player selected by the subscriber, and consequently on other "Laker"-related broadcasts that may interest the subscriber.

Figure 6:
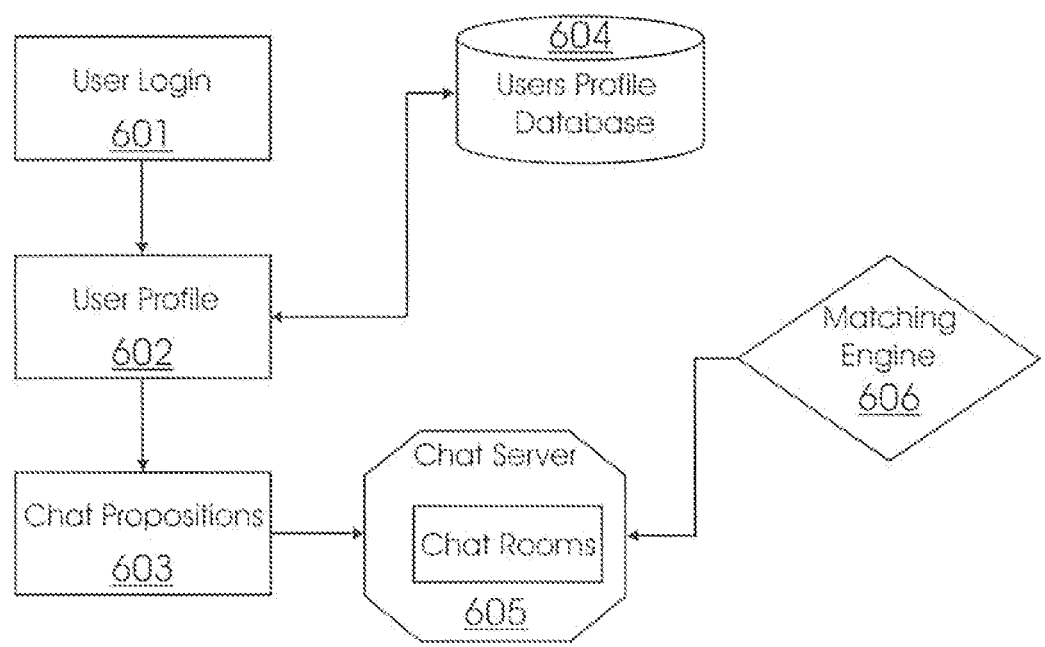
FIG. 6 is a schematic diagram of a user chat feature of a radio flagging system, in accordance with the present invention.

FIG. 6 is a schematic diagram of a user chat feature of a radio flagging system 1000, in accordance with the present invention. After a successful login, as indicated by block 601, the user is directed to his profile, as indicated by block 602. The system 1000 automatically retrieves all user information from the user profile database, as indicated by block 604. If the user had received any recent alerts during a specified time period and enough interest is generated in the same topics by other users, the system 1000 will then set-up "chat" rooms, focusing on the same topic, and present those links for those chat rooms to the identified users, the links being automatically generated on a chat server, as indicated by block 605, via the matching engine, as indicated by block 606. Thresholds for generating the chat rooms related to specific topics are set by administrators of the system 1000 based on the number of SMS messages being sent that are related to those specific topics during specific periods of time. For example only, the threshold is set by the system 1000 at 100 alerts and 300 SMS messages sent to the users. This circumstance results in the matching engine creating a chat room on the chat server for this particular topic. Conversely, if the number of SMS messages is less than 100 alerts, no chat room is created, and users are not presented with any link to any room related to that topic or story.

In relation to FIG. 6, the present system 1000 further analyzes the demographics and psychographics of the mobile community. Text messages are sent, alerting subscribers to other subscribers who fall into the same demographic or psychographic category and who recently listened to the same broadcast and inviting them to chat with selected other subscribers about a given topic, story, or music. This text messaging option is performed by the system 1000 acting as the intermediary clearing house for messages, maintaining confidentiality of phone numbers. After a tune-in alert is received, the broadcast heard, and the advertisement has been read and or opted-in, another alert is sent to invite the user to chat via text messaging. A web chat is the primary chat venue available for the system 1000. Should the system 1000 deem a topic or a story to be of high priority in terms of popularity to its subscribers, those subscribers who were alerted to such topics or stories are then sent a link to their mobile device, by e-mail or by logging into the system website, whereby the users access the chat room and participate in chatting with other users about the broadcasted event.

Figure 7:
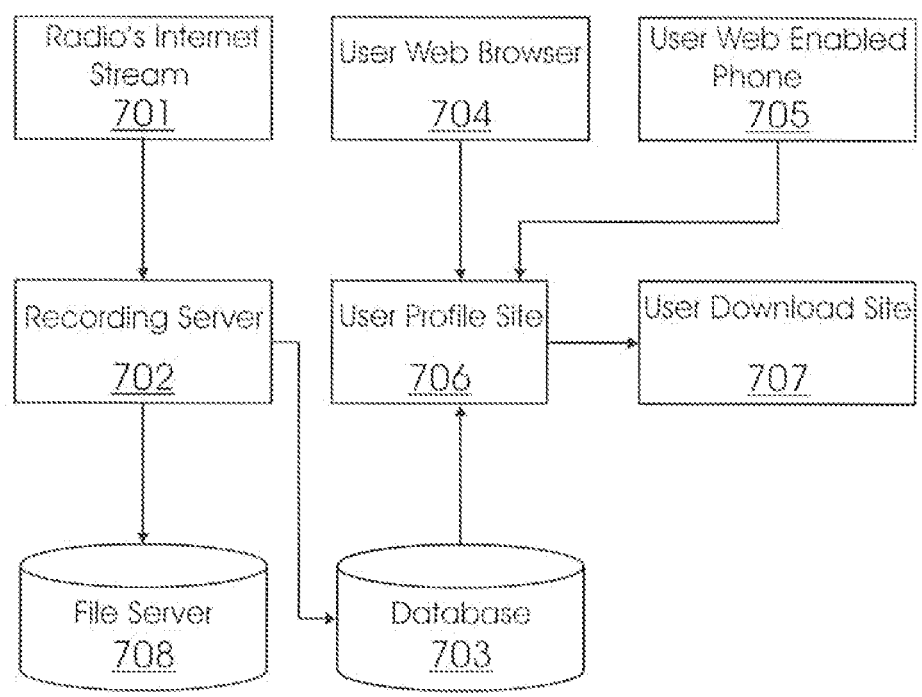
FIG. 7 is a schematic diagram of a podcasting feature of a radio flagging system, in accordance with the present invention.

FIG. 7 illustrates, in a schematic diagram, a podcasting feature of a radio flagging system 1000, in accordance with the present invention. This flowchart presents the outline of the podcasting or flag-casting feature of the system 1000. First, the Internet radio stream, as indicated by block 701, is recorded by a recording server, as indicated by block 702. The identified sound recording is then clipped into 15-minute long segments and stored in a file server as a sound file, as indicated by block 708. Information identifying this specific segment is also stored in a database, as indicated by block 703. Based on user-defined settings in the profile as indicated by block 706, the user is presented with downloadable links as indicated by block 707, to the file server as indicated by block 708. The user is then enabled by the system 1000 for changing the settings and flag-casting preferences by using the web-enabled phone as indicated by block 705, a regular web browser as indicated by block 704, or touch-tone options operated phone.

For example, podcasting download commands will also be available to the system 1000 subscribers in the following manner. Should a subscriber be alerted to a broadcast and is unable to listen to the broadcast in real time, the subscriber may send a command to the system 1000 to record, send, and store the broadcasted segment of interest for later downloads. Should an alerted broadcast conflict with a subscriber's ability to tune-in real-time, an automated option is available in the system 1000 for allowing the subscriber to podcast or flag-cast the broadcast content directly to an iPod® folder for later downloading via a mobile phone in a short code manner. Messages will also be sent later as notification of available flag-casting downloads of missed shows or segments when a phone is deactivated. Should the stations participate in sharing its saved podcasts, then the system 1000 assembles a library of all radio podcasts of which subscribers can access. Users can then download to a cellular phone and then to an MP3 device. Also, a personalized flag-cast library is assembled by the subscriber. A sample of the flag-cast, following a broadcast, is available for listening on the mobile unit. As such, the subscriber decides whether to save and send it to his personal library for later listening, e.g., via a cellular phone or a headset. On audio-streaming-capable phones, a short code can be sent to request playing of a live flagged broadcast segment.

Figure 8:
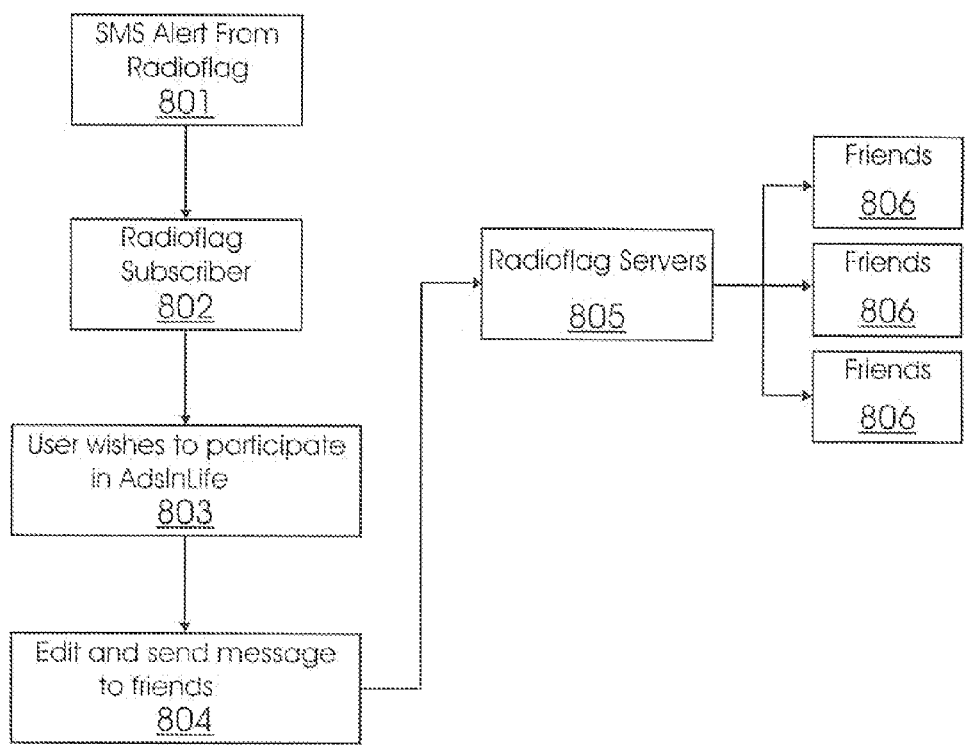
FIG. 8 is a schematic diagram of an interactive advertisement feature of a radio flagging system, wherein a user participates with an advertiser in furthering advertising by making an endorsement of the advertiser's products or services by using a digital photograph of the user and connecting such photograph with a form-advertisement or slogan, in accordance with the present invention.

FIG. 8 illustrates, in a schematic diagram, an interactive advertisement feature of a radio flagging system 1000, wherein a user participates with an advertiser in furthering advertising by making an endorsement of the advertiser's products or services by using a digital photograph of the user and connecting such photograph with a form—advertisement or slogan, in accordance with the present invention. Specifically, a listener text alert is transmitted to a subscriber and is attached to a sponsor advertisement, as indicated by block 801. The user has the option of participating with the advertiser who wishes to further its reach, offering the user a special reward for the user's effort. If the user opts in via text, a set of instructions will be sent to the user's e-mail address, as indicated by block 802. By example only, if the advertiser is MICROSOFT® Inc., the advertiser instructs the user (if he truly enjoys MICROSFOT® products) to approve one of several prepares personalized advertisement lines or slogans, e.g., "love this software." The user takes a digital photo, via camera or camera phone, of himself/herself, as described, supra, and as indicated by blocks 804 and 805. The recipient receives written confirmation that the advertisement originates from the subscriber with the system 1000 being anonymous, wherein the cellular phone numbers remain confidential, unless a recipient opts-in for interaction with an advertiser via text messaging, as indicated by block 806.

In relation to FIG. 8, several types of advertisement are handled by the present invention system 1000. Sponsor advertisements are those that simply feature an advertiser's name. Interactive advertisements are those that seek subscriber interaction by including a short code and instructions to text-back a specific word to opt-into an offer, e.g., receiving a coupon for an online purchase or for scanning at the physical store register. Advertisements target subscribers that the system 1000 recognizes as being likely to drive a specific route to, and from, work. Therefore, an advertisement alerting the user to a sale that is occurring at a store along that route may be sent to the user, which then increases the chances the user may stop on the way home to make a purchase.

The present invention also involves a method M1 of providing a free, wireless, network-based system 1000 for providing listeners with managed, personalized, valued radio broadcast content, in real time, from a broadcasting entity, by way of a mobile device, for offering a mobile marketing medium to advertisers to micro-target consumers with advertisement, for leveraging unmatched psychographics and demographics, and for eliminating a need to surf radio channels, the method comprising the steps of: providing a network; providing a flagging software being made available via the network in a website; and providing at least one mobile device for entering user information by at least one user and for receiving, playing, storing, and retransmitting radio broadcast content, the at least one mobile device being capable of interfacing with the network.

The present invention also comprises a method M2 of providing listeners with managed, personalized, valued radio broadcast content, in real time, from a broadcasting entity, of offering a mobile marketing medium to advertisers to micro-target consumers with advertisement, of leveraging unmatched psychographics and demographics, and of eliminating a need to surf radio channels, by way of a free, wireless, network-based system 1000, the method comprising the steps of: providing the free, wireless, network-based system 1000, the system 1000 providing step comprising the steps of: providing a network; providing a flagging software being made available via the network in a website; and providing at least one mobile device for entering user information by at least one user and for receiving, playing, storing, and retransmitting, radio broadcast content, the at least one mobile device being capable of interfacing with the network; registering at least one user, using the flagging software, as at least one subscriber; using the system 1000 by the at least one subscriber, thereby matching the at least one subscriber with at least one radio broadcast content; and downloading the at least one radio broadcast content via the at least one mobile device.

The method M2 also comprises the step of setting another, or resetting, focused alert preferences differently for other teams or sports by the subscriber. This scheme will be the same for all topics in the selection menu. For example, the present invention system 1000 provides selectable main topics such as sports, health, fitness, science, politics, current events, pets, food, medical topics, home and garden, business/finance, legal topics, personal counseling, religion, music, fashion, entertainment/gossip, fashion, etc.

Also, the present invention system 1000 provides an additional alert options menu from which the subscriber may make selections. When setting the subscriber's alert preferences for each category, the subscriber will be able to select whether the subscriber desires an alert to unrelated broadcasts, i.e., "hot" alerts, which may still be of some interest to subscriber, such lesser priority broadcasts being determined by using an algorithm based on the user's/subscriber's profile. For instance, if the subscriber does want wish to be alerted to run-related broadcasts that may be of some interest, such as breaking hot stories or rare and exclusive interviews, then, even though the subscriber actually selects, for example, the "Boston Celtics," but a rare interview with "Larry Bird" is being broadcast or a story regarding a block buster trade involving the "Chicago Bulls" is being broadcast, then the subscriber may still be alerted to such "breaking" radio broadcast content. These hot alerts will be rated by a scoring system depending on an importance scale or a relevancy scale.

Also the present invention system 1000 provides a section of a home page that features news about all categories. These stories list headlines of breaking news stories provided via "Really Simple Syndication" (RSS), a "web feed" which feeds content from significant online news sites. In this manner, the subscriber can also obtain select news via the present invention flagging system 1000, because the most significant news stories become available as selectable topics by the subscriber. The subscriber can then check boxes adjacent the web links to request alerts relating to the corresponding headlines. If the subscriber wishes to read the entire story on a mobile device, then the subscriber clicks the link and reads the source-provided story, rather than listening to it. The subscriber can also set a minimum number as well as a maximum number of alerts that the subscriber may receive on any given day. Also, the subscriber can select the option for receiving alerts from programs being broadcast on the Internet that originate from other radio markets, thereby rendering the present invention system useful to listeners who are near a computer at a specific time.

In an aspect of the invention, the system is an online social network of radio listeners (users) and a database of radio stations. A user of the social network may listen online to any radio station contained in the database and then flag radio content for distribution through the network. A user's flags may also be shared through email and with third-party social networking platforms such as Facebook® and Twitter®.

A flag may contain information on the radio station being flagged and a message about the content and metadata (e.g., tags, geo-location, event information, URLs). A user may search flags for radio content that has been flagged by other users on the network and then immediately listen to the radio station broadcasting that content through a link contained in the flag.

A flag-cast is a continuously updated feed of flags created on the network. Flag-casts are dynamically generated based on the distribution of flags through the network. A public flag-cast is visible to all users and shows a continuously updated feed of all flags created in the network featuring all or a broad range of topics, categories, users and stations. This is referred to as the broad-cast or broad flag-cast.

Three other flag-casts are the "interests flag-cast," the "stations flag-cast" and the "listeners flag-cast." The interests flag-cast filters flags down to only those generated based on the user's interests. The stations flag-casts filters flags down to only those generated based on stations the user selected as favorites. The listeners flag-cast filters down to only those generated from other users, referred to as "listeners." Those listeners that the user selected as favorites are "tuned in" listeners—the user has tuned into them. A user of the social network who has subscribed to the service can also view flag-casts that are tailored specifically to that user, which the user defines based on subjects (e.g. interests, stations, users). The ability to define flag-casts allows a user to filter flags relevant to his or her interests. Flags that are created and match a user's flag-cast are delivered to the user in real time. Accordingly as the user receives notification of specific radio broadcast content, the user may instantly listen to the broadcast through the link contained in the flag.

A profile database is provided for storing data associated with each of the users. When a user subscribes to services provided by the social network provider, a user profile may be generated for the user. For example, the user may select radio station preferences, topics of interest, or "tune in" to other users' flag-casts. When creating a profile, the user may provide contact information and personal statistics. When the user adds additional information to the user profile, such as "tuning in" to other users, the user profile in the profile database may be updated with the information added.

The social network provider includes a communications interface for communicating with users over the network. The interface allows the user to communicate various types of information, such as profile settings, topics of interest, listings of other users, and so forth, to the social network provider.

A monitoring module tracks one or more user activities on the social network. For example, the monitoring module can track user interaction with one or more entities of the social network, including flags, other users' profiles and radio stations. Any type of user activity can be tracked or monitored via the monitoring module. The monitoring module may determine an affinity of the user for radio station preferences, other users, topics of interest and the like according to users' activities.

A station database is provided for storing radio station data. This data is aggregated using external entities. The stations may be tracked by the monitoring module. Stations monitored by the monitoring module may be stored in the activity database. The station database may be used to store information about radio stations including call signs, frequencies, bands, streams, locations and the like.

An activity database is provided for storing activity data about each user. The activities may be tracked by the monitoring module. Activities monitored by the monitoring module may be stored in the activity database. Activity entries in the activity database may include a timestamp indicating time and date of the activity, the type of activity, the user initiating the activity, any other users who are objects of the activity, and the like.

A flag database is provided for storing flag data posted by the users. The flags may be tracked by the monitoring module. Flags monitored by the monitoring module may be stored in the activity database. Flags stored in the flag database may include a timestamp indicating time and date of the flag posting, the user initiating the flag, the geographic location of the flag posting, tags associated with the flag, the station related to the flag, and the like.

A trending component is provided for extracting information from the activity database. This component feeds into a flag-cast delivery component. Trends are calculated based on user interaction within the social network.

The flag-cast delivery component is configured to limit the number of flags displayed in each flag-cast. The flag-cast delivery component selects current flags, e.g., the most recent twenty (or a random number) flags according to the timestamp, for display in the flag-cast. In various embodiments, the flag-cast delivery component selects flags according to viewing user preferences, profile settings, subject user priorities (e.g., subject user affinity), subject user preferences (e.g., subject user profile settings), filters, and the like.

In some embodiments, the flag-cast delivery component may maintain a flag-cast for each user comprising a list of a predetermined number of flags about the user. The flag-cast delivery component may place the most recent flags at the top of the list and remove the oldest flags from the bottom of the list for each new activity.

A semantics search component is provided that allows the user to search flag-casts based on the semantic details of a flag. This component preferably uses natural language processing to extract specific content from the flags and simultaneously understand the searcher intent and the contextual meaning of terms as they appear in the flag database.

Figure 9:
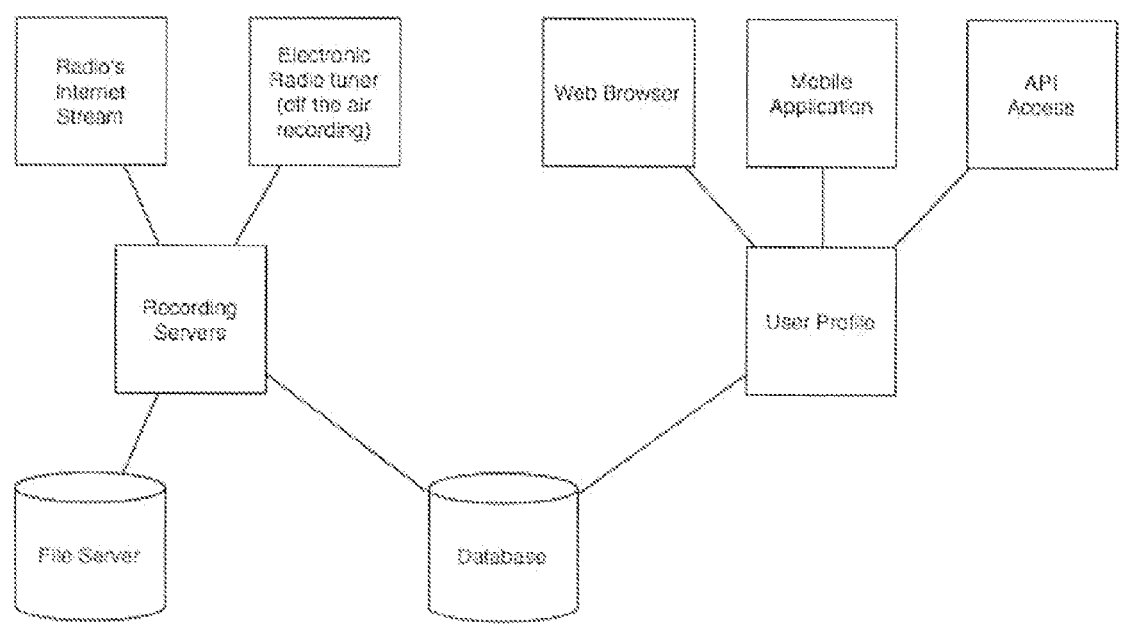
FIG. 9 is a schematic diagram of an on-demand radio station recording feature of a radio flagging system, in accordance with the present invention.

By reference to FIG. 9, the user can request on demand recording or schedule the recording of the specific radio station or radio program through the system's web page, mobile device application, or API. This request is then stored in the system's databases under the user's profile. The information is instantly visible to recording servers that start recording the radio stream when scheduled. The recording servers use internet radio streams or off the air electronic tuners to save the recording to an audio file. The user can access the requested recordings (audio files) through the system's web page, mobile device application, or API.

The system also allows users to create custom tags. The custom tags, for example, can include a space (such as #great station). As such, the system permits types of semantic web communication that are not available in existing platforms.

The system may also include a metatag preset list that allows users to tag those words that give a flag better context. By tagging a specific word with a number sign (#), other users can easily identify and search the flag content. This also ultimately helps other users find what most interests them when using the system's search engine. A user can also tag by selecting from a preset list of speed tags, which includes topics and categories considered most popular.

With respect to advertising, by ignoring current social media technology, radio is on the verge of being left out of the listening audience conversation entirely and ultimately being left behind by the advertisers who want in on that conversation.

Advertising and radio go hand in hand; they are an accepted media tandem, so resistance is less likely. Even still, the system preferably incorporates a micro-targeted approach based on data that identifies the user as one who welcomes the ad message. As such, the ad delivery method is gentle and non-invasive. The system instantly matches ads with distributed content based on demographics. Even more importantly, and because radio is an excellent indicator of how people think, psychographics are factored in when looking to deliver specific ads to their corresponding audiences. This method also provides companies with immediate feedback. Ads can be in the form of text, app display, audio clips, and video.

The micro-targeting ability that the system provides is particularly critical for the vast, untapped universe of small advertisers. In the current environment most traditional broadcast mediums, including many newspapers, are too expensive for a small advertiser because the high upfront costs associated with ad development combine with the expense of broad brush distribution, resulting is a geographic waste of limited advertising resources. Micro-targeting solves these problems by providing the information necessary to focus ad spend exactly where it will have the most benefit.

Even local political campaigns, which had previously relied solely on expensive mass mailings and phone calls, can leverage the system's platform, by reacting to breaking news almost instantaneously, with ad buys laser focused to its constituents.

In addition, as the record industry adjusts to the lower consumption of highly profitable CDs, it will need to generate new revenue streams, as well as find a more efficient medium with which to promote their artists. With the system's ability to direct listeners to tens of thousands of niche and broad-based stations available to anyone who can access some form of radio, the efficiency of promoting music via system's ad-supported search engine is just what the music industry needs.

Figure 10:
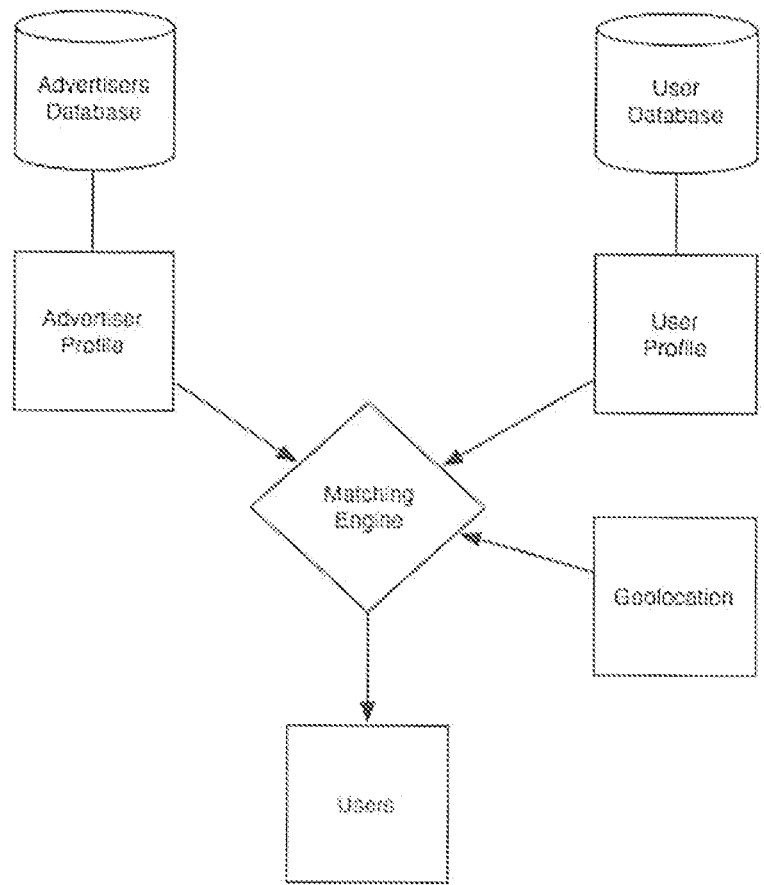
FIG. 10 is a schematic diagram of an advertising feature of a radio flagging system, in accordance with the present invention.

By reference to FIG. 10, ads are matched with users based on their profiles and geo-location information from the mobile devices they run the system's application on (if present). This information is then matched with the best possible advertisement from the advertiser database and sent to the user. The advertiser will be able to customize their profile to target ads based on many levels. The system will ensure that ads are always relevant to the users that they are delivered to.

In addition, the features in the following paragraphs may be present in versions of the inventive system.

Interest folders/batch updates: Each user, after choosing interests (keywords) he or she is interested in, will be able to arrange them in the folders with meaningful names. Those interests and folders will be visible to other users on the system and they will be able to import them to their own interest profiles. This feature will make programming interests (key words) very easy for new users. Some key features of this are: (a) as a user I'll be able to arrange my interests into folders for better interest (keywords) classification; (b) As a user I'll be able to delete folders with all the interests in them; (c) as a user I'll be able to browse other users interests/folders; (d) as a user I'll be able to import other user interests/folders; (e) when importing folders I'll be able to choose if I want to import all the interests in the folder or just the ones I choose to; and (f) as a user I'll be able to import contents of other user folder to a folder I already have in my interests Accessing fellow users' real time listening data: Here one user when accessing another user's profile can see what they are actually tuned into in real time. What station they are listening to right now, and others they have in a history Reflag: One user can reflag the original flag of another if he likes it, thus sharing it with his tuned in network.

Station chat room forum: Here flags are being generated as more of a conversation, since users have selected a station to listen to. These flags are likely buzzing around what the broadcast is about on that station now, so is really a chat.

'Broad base invite' to join: This is when users can adopt the email addresses of those in the contact books of their other social networks, inviting them to join the system.

Ownership of API's: All API's are for public consumption.

Global international: The system has global reach offering international stations Submit own stations: API's are available to users, so they can simply enter and add station streams they like, even if independent only internet station streams Satellite: Satellite stations are also envisioned by the system. When partnering with a satellite provider, should they enable us to offer exclusive discounts to our users, we will embed their satellite streams for free for a specified period only, allowing users to access their audio for free when their stations appear on our flag-casts and are clicked by users. Once the user hits the deadline after their first click which activates that time, the user will be offered discounts to be a member of the provider if he chooses to sign up through the system or on his or her own.

Pay for app feature to avoid ads: Because a version of the system is ad driven, some users may want us to exclude ads from their experience. If that is the case, we can offer them an ad free experience if they pay a monthly fee.

Blocking users by users: Should a user see flags that are irrelevant and or offensive, they may want to block that user from showing in their flag-casts.

Tiny URLs: You can embed a URL to web sites in your flag offering supporting content, or what you believe your fellow users will find as interesting reading material while they listen, or direct them to any page if interest @mentions: Here you can start your flag with an @mention, directing your flag message to another user. If that user wants to search later for flags directed to him or her, he can search in the same way, and all mentions with that user name will be returned.

Flag-casts: There are three primary flag-casts. One that filters and delivers content narrowed by your interests, another by your stations, and the last one by your favorite listeners you have tuned in.

Search flag-casts: You can also when searching for content, choose in which context, such as flags, stations or people/other users.

Broadcast: Means the flag cast which is not filtered. All flags show here related to broad topics and categories, and from a broad base of users.

Alerts capping: An alert cap will be permitted, so each user can limit his or her number of notification alerts TVFlag and Television Flag: The disclosed system can also be applied to television.

Original flag deletion: Original authors of a flag are able to delete that flag any time, so it no longer appears as a flag with his user name attached.

Comments: A comment portion of the flag is envisioned, so attached string of comment entries can be added. This way one flag may generate many comments much like a web story does now.

Auto suggest stations and content shuffle: We envision a shuffle feature, where when hands free, when shuffle is activated, broadcasts will tune from one to another station, likely playing what you want to hear based on your listening habits.

User Suggest: Fellow users can recommend to you to 'tune in' to, so you can tap into their listening habits and connect socially with them since there are common interests.

Auto suggest tags and meta data: When creating flags, a feature will enable you to see what tags and meta data you might want to include in your flag before sending.

Station data research: Here stations are able to access all of our collected listening data, so they can program their shows more effectively and offer their customers better advertising.

Speed Tags: You can also tag by selecting from a preset list of speed tags before you send the flag to give them better context; which includes topics and categories considered most popular. Again, by tagging a specific word with a # sign, it helps other users easily identify and search your flag content, and ultimately helps them find what interests them most when using the system's search engine.

Sharing flags with other social sites: You can choose to re-flag, share with Twitter® and Facebook® and even email the flag to others inside the system and out.

Geo Location: Here you can activate your geo location, should you wish to share where you are with other users.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public, regardless of whether the element, component, or method step is explicitly recited in the claims. However, that various changes and modifications in form, material, and fabrication material detail may be made, without departing from the spirit and scope of the inventions as set forth in the appended claims, should be readily apparent to those of ordinary skill in the art as being encompassed by the present invention. No claim herein is to be construed under the provisions of 35 U.S.C. §112, sixth paragraph, unless the element is expressly recited using the phrase "means for."

INDUSTRIAL APPLICABILITY

This invention may be industrially applied to systems and methods for matching listeners with sound providers. More particularly, the present invention industrially applies to systems and methods for matching radio listeners with radio broadcast providers. Even more particularly, the present invention industrially applies to systems and methods for matching radio listeners with selected and targeted radio broadcast content.

What is claimed is:

1. A method for providing an online social network of radio listeners for a plurality of users, the method comprising the steps of a social network provider:
 (a) providing a database of radio stations, the database of radio stations storing radio station data of one or more radio stations, the radio station data including a call sign, a frequency, a band, a stream location, and a geographic location;
 (b) providing a flagging function, the flagging function allowing each of the plurality of users to generate one or more flags to indicate one or more of the radio stations, delete one or more of the flags, and edit one or more of the flags, the flags including radio station information, a message about radio station content, and metadata about the radio station, the metadata including a tag, a geo-location, event information, and a URL, wherein the flag generated by one of the plurality of users is distributed to at least another of the plurality of users based on user data;
 (c) providing a flag-cast, the flag-cast comprising a continuously updated feed of the flags generated by the plurality of users, wherein the flag-cast is filtered and distributed based on user data;
 (d) providing a profile database, the profile database storing the user data associated with each of the plurality of users, the user data including one or more radio station preferences, one or more topics of interest, user contact information, and user personal statistics;

(e) providing a communications interface, the communications interface allowing each of the plurality of users to communicate user information to the social network provider, the user information including a profile setting, the user data stored by the profile database, and a listing of other users;

(f) providing a monitoring module, the monitoring module tracking one or more user activities on the social network, the user activities including interacting with another user, interacting with a radio station, and generating a flag, the monitoring module tracking one or more of the radio stations;

(g) for each of the plurality of users, the monitoring module determining a radio station affinity, an affinity for another user, and a topic of interest affinity;

(h) providing an activity database, the activity database storing activity data about each of the plurality of users, the activity data including the user activities and, for each of the user activities, a timestamp indicating a time and date of the user activity, an activity type identifier, an indicator whether the user initiated the user activity, and a list of other users associated with the user activity;

(i) providing a flag database, the flag database storing flag data related to the flags generated by each of the plurality of users, the flag data including a timestamp indicating a time and date of the flag, an indicator whether the user initiated the flag, the geographic location of the flag, a tag associated with the flag, and a radio station related to the flag;

(j) sharing the flag and the flag data of one or more of the plurality of users with a third-party social networking platform;

(k) providing a trending component, the trending component extracting the activity data from the activity database and calculating one or more trends from the activity data;

(l) providing a flag-cast component, the flag-cast component limiting the flags displayed in the flag-cast by the flag-cast component identifying selected flags, the selected flags being a segment of the flags having the most recent timestamps;

(m) providing a semantics search component, the semantics search component allowing each of the plurality of users to search for a flag-cast based on one or more semantic details of the flag data, the semantics search component using natural language processing; and (n) matching an advertisement to one or more of the plurality of users based on the user data and the user activities and presenting the advertisement to the matched users.

2. The method of claim 1, the selected flags being a segment of the flags corresponding to a user interest, thus defining an interests flag-cast.

3. The method of claim 1, the selected flags being a segment of the flags corresponding to a favorite radio station, thus defining a stations flag-cast.

4. The method of claim 1, the selected flags being a segment of the flags corresponding to a favorite listeners group, thus defining a listeners flag-cast.

* * * * *